L. KASPAR.
MACHINE FOR SHELLING AND POLISHING GRAIN AND THE LIKE.
APPLICATION FILED NOV. 6, 1920.
1,375,592
Patented Apr. 19, 1921.
2 SHEETS—SHEET 1.
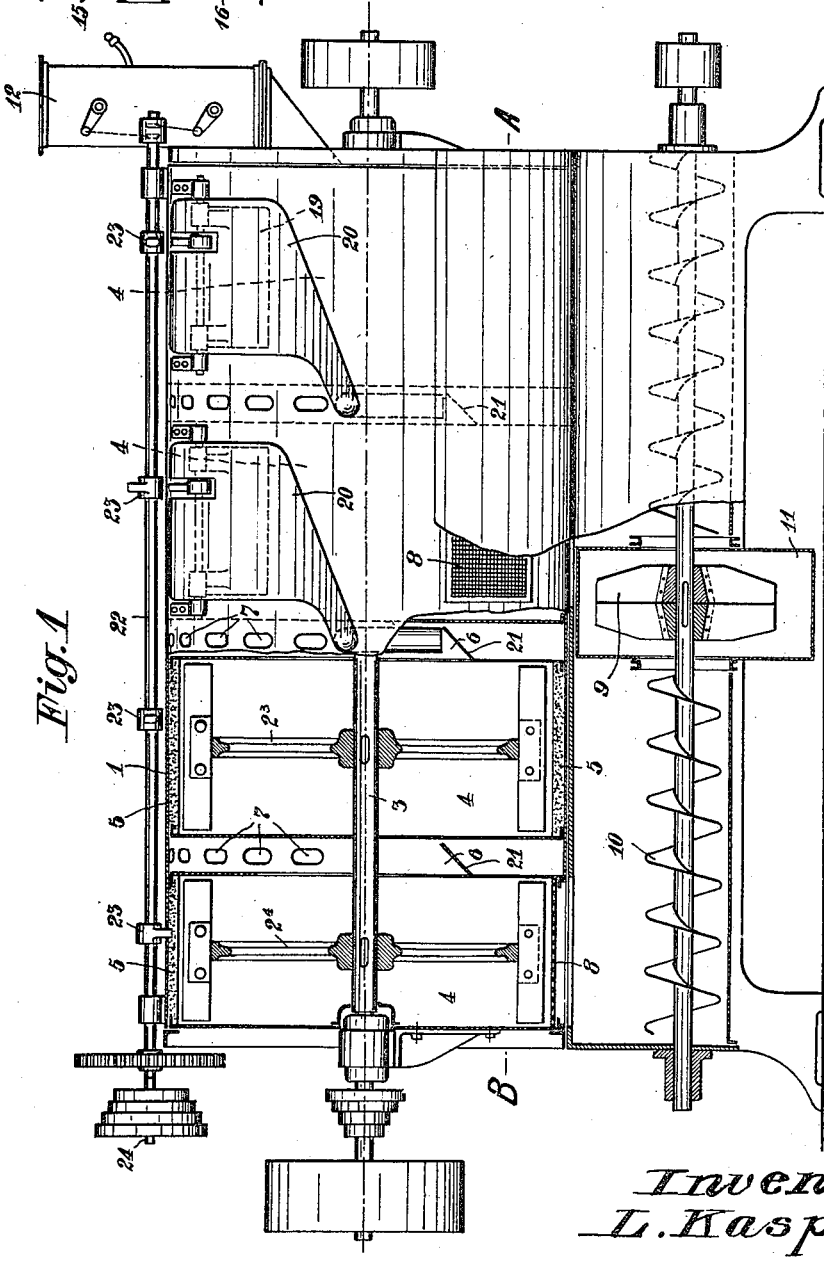

L. KASPAR.
MACHINE FOR SHELLING AND POLISHING GRAIN AND THE LIKE.
APPLICATION FILED NOV. 6, 1920.
1,375,592.
Patented Apr. 19, 1921.
2 SHEETS—SHEET 2.
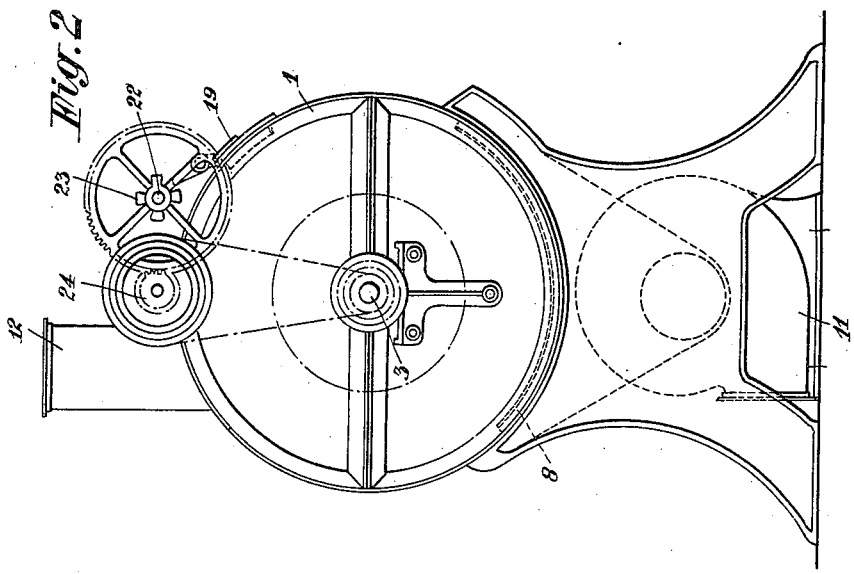
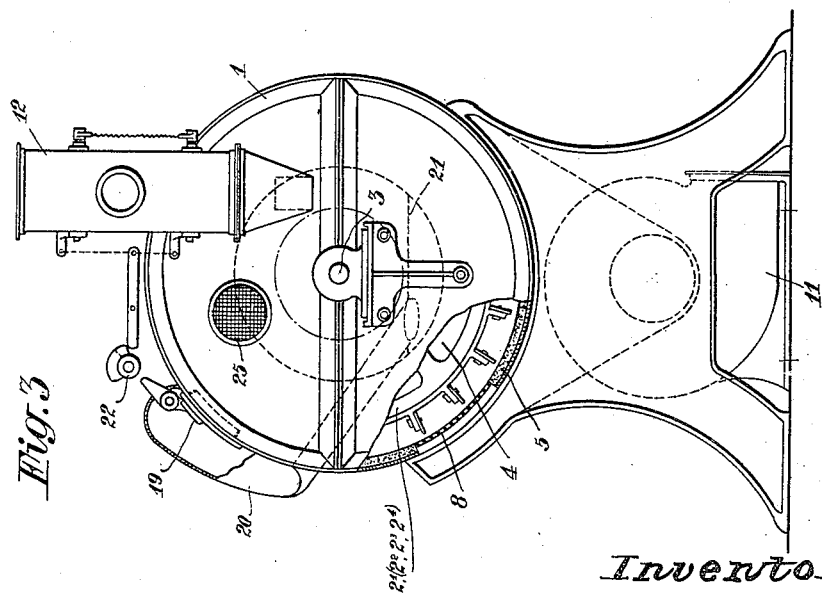
Inventor
L. Kaspar,
By H. R. Kerslake,
Attorney

UNITED STATES PATENT OFFICE.

LEOPOLD KASPAR, OF GROSS-SENITZ, CZECHO-SLOVAKIA.

MACHINE FOR SHELLING AND POLISHING GRAIN AND THE LIKE.

1,375,592.  Specification of Letters Patent.  Patented Apr. 19, 1921.

Application filed November 6, 1920. Serial No. 422,342.

*To all whom it may concern:*

Be it known that I, LEOPOLD KASPAR, a citizen of the Republic of Czecho-Slovakia, residing at Gross-Senitz, Czecho-Slovakia, have invented certain new and useful Improvements in Machines for Shelling and Polishing Grain and the like, of which the following is a specification.

This invention has for its object to provide an improved machine for shelling, polishing and the like treatment of grain, such as for instance corn, legumes, and the like seeds (clover seed and the like) by means of a plurality of inter-communicating shelling chambers.

The invention consists in the arrangement that the several shelling chambers are shut off from one another, and that the closing devices are provided with means whereby during the shelling operation, any two can be placed temporarily into communication with each other, so that they can be run with a full charge simultaneously during a working period.

An improved machine according to this invention differs from the known machines comprising a plurality of inter-communicating shelling drums, by the feature that as a result of its shelling chambers so constructed as to be capable of being shut off from one another, each drum can operate as an independent unit, so that the material being shelled can be treated in each drum for any desired length of time at any suitable speed of revolution, that is to say, the duration of the treatment is independent of the peripheral velocity of the shelling drums, whereas in the known machines, owing to the permanent communication between the shelling chambers, the length of time occupied by the passage of the material through the machine can be varied only by varying the peripheral velocity of the shelling drums or the velocity of the treatment.

As compared with the machine having one or two drums, the advantage is attained that the several drums with equal shelling action can be made considerably smaller. Because if the shelling is effected in two drums, of which one is discharged into the other, then one drum always runs empty, so that the second drum must have the same area of operating surface or shelling surface as if only a single drum were employed for the shelling process. A shelling apparatus having two drums has therefore only the drawback of entailing a double area of operating surface and consequently double the cost. The employment of more than two drums, according to the present invention, however provides a means of diminishing the operating surface of each drum, and consequently enabling small drums having a small area of operating surface, to be used. Because if the shelling process is effected in more than two shelling drums, and preferably in more than three shelling drums, of which each operates as an independent unit, the material to be shelled being emptied from one into the other, it can be so arranged that during one working period a plurality of shelling drums can be run full, and the sum of the areas of the operating surfaces of the full drums need only be equal to the area of operating surface of the known shelling machines having one drum. Consequently by diminishing the shelling drum, the apparatus becomes cheaper, and the operating surface of each shelling drum can be renewed at a considerably lower cost; because when the operating surface of the known machines having one or two drums has become damaged, a new operating surface is required that is equal to the total operating surface, whereas in a machine according to the present invention, only the renewal of considerably smaller operating surfaces is required.

When the arrangement is such that the charging of the machine and the discharging or ejection of the shelled material from the machine are to take place simultaneously, then idle intervals are avoided between the charging and the discharging of the material. This accelerates the working process and moreover avoids shocks which are caused in the known machines by the circumstance that the machine is relieved of load between the charging and discharging of the material. These shocks have a reaction upon the driving engine to which usually machines of other kinds, such as electric dynamos, are connected, so that these are caused to work unsteadily by the effect of the shocks.

According to the present invention the apparatus is so constructed that the temporary communication between the chambers of the shelling drums or the like, is established by means of positively actuated shutting-off devices having a common control, so that by varying the speed of revolution of the shaft controlling the shutting-off devices, it is possible to vary the duration of the communication and through it the duration of the passage of the material through the machine.

For the purpose of enabling the several shelling chambers to be ventilated, there are employed according to this invention, intermediate chambers which also serve to contain the apparatus for transferring the material from one shelling chamber into another shelling chamber.

A constructional example of an improved apparatus according to this invention is illustrated in the accompanying drawings, in which, Figure 1 is a side elevation of the machine partly in section.

Figs. 2 and 3 are elevations of the opposite ends of the machine, partly in section.

Fig. 4 is a sectional view through the feed hopper detached.

Referring in detail to the constructional example shown in the drawings, 1 is a casing containing a plurality (for instance four) of shelling drums $2^1$, $2^2$, $2^3$, $2^4$ with a common driving shaft 3. The arrangement is such that between the several shelling drums which coöperate in the usual manner with a suitable operating surface of the casing 1, there are arranged intermediate chambers 6 provided with air admission for the purpose of ventilating the middle shelling chambers, and the apparatus for transferring the grain from one drum into the adjacent drum. Each of the inner shelling chambers 4 is open on one side and closed on the other side, so that it is in communication with one intermediate chamber, but is shut off from the other intermediate chamber.

For the purpose of ventilating the shelling chambers there are formed in the intermediate chambers air apertures 7 that prevent the grain from falling through, but preferably formed only in the upper half of the casing. The several shelling drums are thus able to act during the working as fans that draw continuously air through the intermediate chambers. By this means in combination with sieve-like apertures 8 of the shelling chambers which prevent the grain from passing out, the dust, chaff, the shelled husks and the like, are blown out of the shelling chambers into the common casing. The substances blown out of the shelling chambers, may be collected if desired by means of a worm conveyer 10, and are blown or conveyed by means of a fan 9 out of the machine through the outlet neck 11 of the fan.

In the constructional example shown in the drawings, the shelling drums 2 and shelling chambers 4 are made narrower from the inlet side A where the charging takes place, toward the outlet side B where the shelled and, if desired, polished material is discharged, so that the shelling chamber $2^1$ that contains the inlet is widest, whereas the shelling chamber $2^4$ containing the outlet, is the narrowest. In this manner the circumstance is taken into consideration that the progress of the shelling action from the inlet toward the outlet, requires for filling the chambers a gradually smaller volume, so that by diminishing the capacity of the several shelling chambers in accordance with the progress of the shelling action, the result is gained that the play of the grain in the several shelling chambers is not prejudicially varied or increased. Because the fuller the shelling chambers, the better is the shelling action of the grain in the longitudinal direction as is well known.

The charging of the first chamber 4 may be effected in a manner known *per se*. For supplying the shelling material, there is employed for instance a feed hopper 12 which is supplied continuously with the material, and which however allows the said material to pass only in a previously determined quantity at intervals into the shelling drum. The feed hopper 12 has two preferably funnel-shaped bottoms 13 and 14 (Fig. 4) whose passage apertures can be closed and opened by means of rotary slides 15 and 16 arranged so as to rock beneath them. In the space 17 between the two bottoms 13, 14 which serves as a measuring space, there is arranged so as to rock, a flap 18 which can be fixed, and which by its inclination determines the capacity of the funnel, that is to say, the amount of material to be shelled, required for one charge of the machine.

According to the present invention the motion of the slides 15 and 16 takes place simultaneously with the apparatus for transferring the grain from one shelling chamber into the other; the passage of the material from each shelling chamber taking place on the revolving surface, that is to say, on the surface of the casing.

This apparatus consists, in the case of each drum, of a shutting-off device constituted by a flap 19 with an immediately adjacent shoot 20. This shutting-off device is adapted to be opened and closed again automatically on the expiration of the period previously determined for the shelling process. When the flap is open, the material is discharged through the shoot 20 into the intermediate chamber 6 from which it slides over a slide surface 21 into the adjacent shelling drum. The sliding surface 21 is so arranged that the grains pass into the shelling chamber, outside the path of the shelling drum, and are not subjected to the action of the shelling drum during the feeding.

All the flaps 19 are actuated from a common operating shaft 22 by means of tappets 21, the control being preferably of such nature that the charging of the first chamber and the discharging of the last chamber take place simultaneously. By varying the speed of rotation of the operating shaft 22 the duration of the shelling operation in the several shelling chambers may be varied or regulated. The slower the tappet shaft 22 revolves relatively to the shelling drums, that is to say, relatively to the drum shaft 3, the greater will be the shelling action, that is to say, the longer will be the duration of the passage of the material to be shelled through the machine.

The operating shaft 22 may be driven from the drum shaft 3 (Fig. 2) for instance through the medium of an intermediate shaft 24, and it is advisable for the purpose of varying the speed of the operating shaft 22 to provide a suitable change speed gear in the drive.

The greater the number of shelling chambers that are provided, the more uniform will be the working of the machines and the smaller the drums can be made. For practical work, consequently only machines having at least three shelling drums, but preferably more than three shelling drums, come into consideration.

The manner of operation of the improved machine can be clearly understood from the specification.

The charging of the first chamber and the discharging of the last chamber take place simultaneously during the one revolution of the operating shaft 22, whereas the flaps 19 of the several chambers are opened and closed at different other points of time. Each shelling drum acts at the same time as a fan, the first shelling drum sucking air through the aperture 25 while the others suck in air through the apertures 7 of the intermediate chambers, and force the said air out through the sieve-like apertures 8, so that the current of air carries away with it the dust, the chaff, and the shelled husks. The shelling action can be so regulated that the last chamber acts only as a polishing chamber.

What I claim is:—

1. A machine for shelling, polishing and the like treatment of grain and the like, comprising a plurality of shelling chambers adapted to be traversed in succession by the material to be shelled, the several shelling chambers being normally shut-off from one another, means for establishing communication between any two chambers temporarily during the working, so that they can run full at the same time during one and the same working period.

2. A machine for shelling, polishing and the like treatment of grain comprising a plurality of shelling chambers adapted to be traversed in succession by the material to be shelled, intermediate chambers interposed between the shelling chambers and each communicating with one of said shelling chambers, said intermediate chambers having means for effecting ventilation of the communicating shelling chamber, and means for temporarily establishing communication between each shelling chamber and the intermediate chamber having communication with the next adjacent shelling chamber whereby grain is successively conducted from one chamber to the other.

3. A machine for shelling, polishing and the like treatment of grain and the like comprising a plurality of shelling chambers adapted to be traversed in succession by the material to be shelled, the several shelling chambers being normally shut off from one another, means for establishing communication between any two adjacent shelling chambers temporarily during operation of the machine, said last mentioned means including shut off flaps, and means for actuating said shut off flaps whereby duration of the communication and therefore of the passage of the material through the machine may be varied by varying the speed of the operating means.

4. A machine for shelling, polishing and the like treatment of grain and the like comprising a plurality of shelling chambers adapted to be traversed in succession by the material to be shelled, the several chambers being normally shut off from one another, intermediate chambers interposed between certain of the shelling chambers and each having communication with one shelling chamber, means for temporarily establishing communication between any one of the shelling chambers and the intermediate chamber having communication with the next adjacent shelling chamber for conducting material from one shelling chamber to the next succeeding one, the last mentioned means including shut off flaps, actuating means for said flaps, and means whereby the duration of the communication and therefore of the passage of the material through the machine may be varied by varying the speed of the actuating means.

5. A machine for shelling, polishing and the like treatment of grain and the like comprising a plurality of shelling chambers adapted to be traversed in succession by the materials to be shelled, the several shelling chambers being normally shut off from one another, intermediate chambers interposed between certain of the shelling chambers and each having communication with one of the shelling chambers, grain conducting means connecting certain of the shelling chambers with the intermediate chambers having communication with the next adjacent shelling chambers, means for conducting material deposited in the intermediate chambers into the communicating shelling chambers, means for temporarily establishing communication between the shelling chambers and the grain conducting means, and means for controlling the last mentioned means.

6. In a machine for shelling, polishing and the like treatment of grain or the like comprising a plurality of shelling chambers adapted to be traversed in succession by the material to be shelled, the several chambers being normally shut off from one another, and means for temporarily establishing communication between any two adjacent shelling chambers, said shelling chambers being made smaller from their inlet toward their outlet for the purpose of maintaining the pressure of the material of the several chambers irrespective of the progressive shelling action.

In testimony whereof I have signed my name to this specification.

LEOPOLD KASPAR.

Witnesses:
JARASLEOV HAJSOK,
ANTONIN FRANC.